United States Patent [19]

Nakatani et al.

[11] Patent Number: 4,981,759

[45] Date of Patent: * Jan. 1, 1991

[54] COATING METHOD

[75] Inventors: Eisaku Nakatani; Masaru Mitsuji; Yasuhiro Fujii; Katsuya Sera; Yuzo Miyamoto; Masafumi Kume; Tadayoshi Tatsuno; Akimasa Nakahata, all of Hiratsuka, Japan

[73] Assignee: Kansa Paint Co., Ltd., Hyogo, Japan

[ * ] Notice: The portion of the term of this patent subsequent to Apr. 10, 2007 has been disclaimed.

[21] Appl. No.: 189,167

[22] Filed: May 2, 1988

[30] Foreign Application Priority Data

| Date | Country | Number |
|---|---|---|
| May 2, 1987 | [JP] Japan | 62-107956 |
| Jul. 10, 1987 | [JP] Japan | 62-173541 |
| Jul. 10, 1987 | [JP] Japan | 62-173542 |
| Jul. 10, 1987 | [JP] Japan | 62-173543 |
| Jul. 14, 1987 | [JP] Japan | 62-175453 |
| Jul. 22, 1987 | [JP] Japan | 62-183211 |
| Jul. 22, 1987 | [JP] Japan | 62-183212 |

[51] Int. Cl.$^5$ ............................................. C25D 13/06
[52] U.S. Cl. ..................... 428/626; 428/416; 204/181.1; 204/181.7; 427/410
[58] Field of Search ............... 204/181.1, 181.7; 106/439; 523/415, 412, 413, 404, 425; 427/410; 524/901; 428/416, 626

[56] References Cited

U.S. PATENT DOCUMENTS

| | | | |
|---|---|---|---|
| 3,869,298 | 3/1975 | Suzuki | 106/439 |
| 3,932,191 | 1/1976 | Jerabek | 204/181.1 |
| 3,998,716 | 12/1976 | Masar | 204/181.1 |
| 4,139,672 | 2/1979 | Ozawa | 204/181.1 |
| 4,174,332 | 11/1979 | Honig | 204/181.7 |
| 4,338,235 | 7/1982 | Haran | 204/181.7 |
| 4,375,498 | 3/1983 | Le Minez | 204/181.1 |
| 4,456,507 | 6/1984 | Kivel | 204/181.1 |
| 4,554,212 | 11/1985 | Diefenbach | 204/181.7 |
| 4,619,746 | 10/1986 | Delaney | 204/181.1 |
| 4,755,418 | 7/1988 | DebRoy | 204/181.1 |

*Primary Examiner*—John F. Niebling
*Assistant Examiner*—Ben C. Hsing
*Attorney, Agent, or Firm*—Wenderoth, Lind & Ponack

[57] ABSTRACT

A coating method, which comprises
 (i) applying to a substrate a multilayer film-forming cationic electrodeposition paint composed of
  (A) a cationic electrodepositable epoxy resin having a surface tension of 40 to 60 dynes/cm and being able to form a cathodically electrodepositable aqueous bath by neutralization with an acid, and
  (B) a nonionic film-forming resin having a surface tension of 25 to 45 dynes/cm,
 the weight ratio of resin (A) to resin (B) being from 60:40 to 98:2 and the surface tension of resin (A) being greater than that of resin (B), and curing the coated film by heating,
 (ii) applying a water-base or organic solvent-base colored paint as a first top coat, and
 (iii) applying as a second top coat a powder paint capable of forming a transparent film which may be colored.

19 Claims, No Drawings

COATING METHOD

BRIEF DESCRIPTION OF INVENTION

This invention relates to a coating method which has a reduced number of coating steps, gives coated films of a very good finished appearance and can advantageously lead to resources saving and pollution control.

BACKGROUND OF INVENTION

Outside panels of automobiles, bicycles, electrical appliances, etc. which require an aesthetic appearance are generally finished with thermosetting paints diluted with organic solvents. In many cases, this is accomplished by a so-called 2-coat 1-bake process which comprises applying a cationic electrodeposition paint to a substrate for corrosion resistance, applying an intermediate paint to secure weatherability, curing the two coated films by heating, further applying an organic solvent-base thermosetting enamel paint containing a colored pigment and/or a metallic pigment (to be referred to as the "base coat") as a top coat, air-drying the top coat, further applying an organic solvent-base thermosetting clear paint to the top coat, and then curing the two coated films simultaneously by heating.

In recent years, there has been an increasing demand for more improved appearances on finishing, for example smoothness, distinctness of image gloss, fatness, resources saving or pollution control, and also for lower coating costs.

With regard to improvement of finished appearances, measures have been taken by adding various rheology controlling agents so as to smoothen top coats, or by polishing intermediate coats. There has also been an attempt at utilizing high-solids paints for pollution control.

The addition of rheology controlling agents in the aforesaid process, however, is not a complete solution to the aforesaid problem because the improvement of smoothness and distinctness of image gloss attained by this method is limited. On the other hand, polishing of the intermediate coats increases the number of process steps and cannot sufficiently improve the finished appearance. Furthermore, conventional organic solvent-base base coats contain large amounts of organic solvents, and this is undesirable from the standpoint of resources saving and pollution control. The reduction of the amount of organic solvents in high-solids paints is naturally limited, and when these paints are used as base coats, whiteness on finish is difficult to obtain in regard to pale-colored metallic paints such as silver-colored paints. On the other hand, a coating process is available which comprises applying a cationic electrodeposition paint, an intermediate paint, a water-base metallic base paint and a powder clear paint. But this coating process has the defect that the number of required steps is large, and the total cost runs high.

The present inventors have extensively made investigations in order to develop a coating method which eliminates the various defects of the prior art described above, has a reduced number of coating steps, gives coated films of a very good finished appearance and can advantageously lead to resources saving and pollution control.

DETAILED DESCRIPTION OF INVENTION

It has consequently been found that the above purpose can be achieved, without the need to use an intermediate coat, by using a cationic electrodeposition paint of a specific composition, a water-base or organic solvent-base colored paint (first top coat) and a powder paint (second top coat).

According to this invention, there is provided a coating method, which comprises
 (i) applying to a substrate a multilayer film-forming cationic electrodeposition paint composed of
  (A) a cationic electrodepositable epoxy resin having a surface tension of 40 to 60 dynes/cm and being able to form a cathodically electrodepositable aqueous bath by neutralization with an acid, and
  (B) a nonionic film-forming resin having a surface tension of 25 to 45 dynes/cm,
 the weight ratio of resin (A) to resin (B) being from 0:40 to 98:2 and the surface tension of resin (A) being greater than that of resin (B), and curing the coated film by heating,
 (ii) applying a water-base or organic solvent-base colored paint as a first top coat, and
 (iii) may be applying as a second top coat a powder paint capable of forming a transparent film which may be colored.

The characteristic features of the coating method of the invention is that without applying an intermediate coat generally used in the prior art, the first top coat (ii) and the second top coat (iii) successively applied to a coated film of the specific cationic electrodeposition paint formed in step (i).

The cationic electrodeposition paint used in step (i) can form a multilayered film having such a concentration gradient that by one electrodeposition coating, the corrosion-resistant resin is mainly distributed in the lower layer (adjoining the surface of a metallic substrate) and the weather-resistant resin is distributed mainly in the upper layer. More specifically, the cationic electrodeposition paint is, for example, a cation electrodeposition paint containing as a binder component a cationic electrodepositable epoxy resin in which a non-ionic film-forming resin having excellent weatherability such as an acrylic resin or a polyester resin is dispersed. The nonionic film-forming resin particles are very stably dispersed in the epoxy resin, and the paint has excellent storage stability. As a result of mixing the cationic electrodepositable epoxy resin and the nonionic film-forming resin in specific proportions and limiting the surface tensions of the two resins as mentioned above, a coated film electrodeposited from a cationic electrodeposition bath formed by using this cationic electrodeposition paint is of such a multilayered structure that on baking, the nonionic film-forming resin rises in the upper layer and the epoxy resin migrates to the lower layer contacting the surface of the metallic substrate owing to the difference in surface tension, and consequently, the upper layer is mainly occupied by the nonionic film-forming resin and the lower layer is mainly occupied by the epoxy resin. Hence, by one electrodeposition coating and baking, a multilayered coated film having excellent corrosion resistance and weatherability can be formed.

It has been found that in the method of this invention, when the step of applying an intermediate coat is omitted and the top coats are directly applied successively in steps (ii) and (iii) on the cured coated film of the cationic electrodeposition paint, peeling of the top coats upon exposure to weather (the phenomenon in which the primer is photodegraded by the light which has permeated the top coats, and during outdoor exposure, peeling occurs between the primer and the top coat) does not at all occur. In addition, the method of this invention has the advantage that the coating steps can be decreased since the intermediate coating step can be omitted, and the coating cost can be reduced.

The coated film of the cationic electrodeposition paint formed in step (i) has excellent weatherability. Specifically, when the cured coated film of the above paint alone is irradiated with light of 1100 joule/m².hr for 40 hours, the film has a 60° specular reflectance retention of usually at least 50%, preferably at least 60%.

The colored paint used in step (ii) may be, for example, a metallic or solid color paint containing water and/or an organic solvent as a solvent or a dispersion medium. Since the colored paint is generally used in low solids concentrations, it has a large volumeric shrinkage during the time from coating to curing and the scaly metallic pigment in it is easily oriented parallel to the coated surface. Hence, a brilliant metallic feeling can be easily obtained. Furthermore, in solid color finishing, the uneven surfaces that occurs upon coating can be easily smoothened, and the resulting coated film has excellent smoothness and distinctness of image gloss.

Since the powder paint applied in step (iii) does not at all contain an organic solvent, it is particularly effective for resources saving and pollution control. Furthermore, since it can be coated to a thickness of 60 microns or more, the coated surface can be finished to an excellent appearance having fatness, smoothness and distinctness of image gloss.

The coating method of this invention will be described below more specifically.

(i) Cationic electrodeposition paint

The cationic electrodeposition paint which is applied to the surface of a metallic substrate in step
(i) is a multilayer film-forming cationic electrodeposition paint composed of
(A) a cationic electrodepositable epoxy resin having a surface tension of 40 to 60 dynes/cm and being able to form a cathodically electro-depositable aqueous bath by neutralization with an acid [to be referred to as resin (A)], and
(B) a nonionic film-forming resin having a surface tension of 25 to 45 dynes/cm [to be referred to as resin (B)].

The weight ratio of resin (A) to resin (B) is from 60:40 to 98:2 and the surface tension of resin (A) is greater than that of resin (B).

The cationic electrodepositable epoxy resin [resin (A)] may be any of the amine/epoxy resin adducts used heretofore in the field of cationic electrodeposition coating. Examples include adducts of polyepoxides and primary mono- or polyamines, secondary polyamines or primary-secondary mixed polyamines (see, for example, U.S. Pat. No. 3,984,299); adducts of polyepoxides and secondary mono- or polyamines having a ketiminized primary amino group (see, for example, U.S. Pat. No. 4,017,438); and products obtained by etherifying polyepoxides with hydroxy compounds having a ketiminized primary amino group (see, for example, Japanese Laid-Open Patent Publication No. 43013/1984). These polyamine resins can be cured with polyisocyanate compounds blocked with alcohols, and form electrodeposited films.

Amine/epoxy resin adducts which can be cured without using blocked isocyanates may also be used. Examples include resins obtained by introducing betahydroxyalkylcarbamate group into polyepoxides (see, for example, Japanese Laid-Open Patent Publication No. 155470/1984); and resins of the type curable by ester interchange reaction (see, for example, Japanese Laid-Open Patent Publication No. 80436/1980). The polyepoxides used in the production of resin (A) include polyglycidyl ethers of polyphenols which can be produced by reacting polyphenols with epichlorohydrin in the presence of alkalies. Typical examples of the polyepoxide are bis(4-hydroxyphenyl)-2,2-propane, bis(4-hydroxyphenyl)-1,1-ethane, bis(4-hydroxyphenyl)methane, 4,4'-dihydroxyphenyl ether, 4,4'-dihydroxydiphenylsulfone, phenol novolaks and cresol novolaks, and polymers thereof.

Polyglycidyl ethers of polyphenols having a number average molecular weight of at least about 380, preferably about 800 to 2,000 and an epoxy equivalents of 190 to 2,000, preferably 400 to 1,000 are especially preferred among the above polyepoxides in regard to prices and corrosion resistance. Especially preferred are polyepoxides of the following general formula

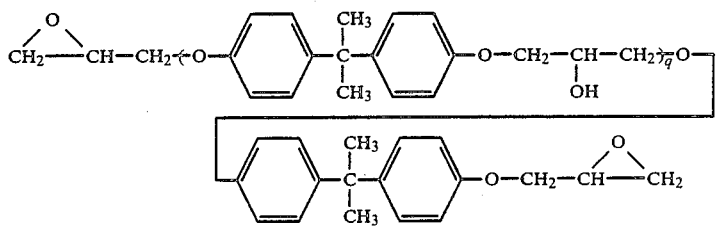

wherein q is 0 to 4.

Resin (A) in the cationic electrodeposition paint used in step (i) should have a surface tension of 40 to 60 dynes/cm, preferably 45 to 55 dynes/cm. If its surface tension is lower than 40 dynes/cm, its compatibility with resin (B) is excessively good so that it is difficult to form a multilayer coated film having the desired concentration gradient, and the coated film tends to have reduced weatherability and corrosion resistance. On the other hand, if its surface tension exceeds 60 dynes/cm, the concentration gradient advances extremely so that resins (A) and (B) separate completely into two layers, and the delamination strength of the resins (A) and (B) tends to be poor.

The surface tensions of resins (A) and (B) in this invention are measured by the following method.

The resin (A) or (B) is diluted with a solvent. The solution is coated on a degreased smooth tin plate by means of a bar coater to a dry film thickness of 10 microns. The coated film is air-dried at room temperature for one day, and then further dried at 50° C. under 0.1 atmosphere for 1 day. After standing at room temperature for 10 minutes, deionized water is added dropwise, and the angle ($\theta$) of contact with the dried resin is measured.

The surface tension of the resin (A) or (B) is determined from the Sell and Neumann empirical formula $$\cos\theta = \frac{(0.015\gamma_S - 2)\sqrt{\gamma_S\gamma_L} + \gamma_L}{\gamma_L(0.015\sqrt{\gamma_S\gamma_L} - 1)}$$

wherein
$\gamma_L$ is the surface tension (72.8 dynes/cm) of water, and
$\gamma_S$ is the surface tension (dyne/cm) of resin (A) or (B).

The resin (B) used in the cation electrodeposition paint in step (i) may be any of the thermosetting and thermoplastic resins having excellent weatherability. Acrylic resins, polyester resins, polyester-modified resins and silicone-modified resins are preferably used. It is important and essential that the resin (B) is nonionic, namely it does not have a functional group which forms a cationic group by neutralization with an acid. If the resin (B) is ionic, its surface tension becomes high and it is necessary to design the resin (B) such that the surface tension of its skeletal portion (nonionic portion) is low in order to obtain a multi-layered coated film having an ideal concentration gradient. Consequently, the resulting multilayered coated film tends to have low delamination strength and corrosion resistance. Preferred resins (B) will be described specifically.

The nonionic acrylic resins may be obtained by (co)polymerizing at least one unsaturated monomer selected according to the properties required from alkyl (meth)acrylates such as methyl (meth)acrylate, ethyl (meth)acrylate, butyl (meth)acrylate, propyl (meth)acrylate and 2-ethylhexyl (meth)acrylate; hydroxyalkyl (meth)acrylates such as hydroxyethyl (meth)acrylate and hydroxypropyl (meth)acrylate; (meth)acylic acid; aromatic vinyl compounds such as styrene and its derivatives (e.g., alpha-methylstyrene); (meth)acrylonitrile; and butadiene.

These acrylic resins suitably have a number average molecular weight of about 3,000 to about 100,000, preferably about 4,000 to about 50,000. When the acrylic resins contains a hydroxyl group as a functional group, they can be cured by reaction with polyisocyanate compounds which are crosslinking agents for the resin (A).

The nonionic polyester resins as resin (B) may include resins which can be produced, for example, by polycondensing in a customary manner a polybasic acid component such as phthalic acid, phthalic anhydride, isophthalic acid, terephthalic acid, trimellitic acid, trimellitic anhydride, pyromellitic acid, pyromellitic anhydride, hexahyhdrophthalic acid, hexahydrophthalic anhydride, succinic acid, adipic acid, pimelic acid, sebasic acid and brassylic acid and a polyol component such as ethylene glycol, diethylene glycol, propylene glycol, neopentyl glycol, 1,6-hexanediol, trimethylolpropane, glycerol, pentaerythritol and tricyclodecane dimethanol. At this time, the molecular weight of the polymers may be controlled by using benzoic acid, p-t-butylbenzoic acid, etc. as an end blocking agent.

A blend of the acrylic resin and the polyester resin may also be used as resin (B). Polyester-modified (grafted) acrylic resins and acrylic-modified (grafted) polyester resins may be synthesized by combining the aforesaid materials, and can be used as resin (B) (these resins are generically referred to as "polyester-modified resins" in the present application).

The nonionic silicone-modified resins include resins obtained by modifying base resins, such as the aforesaid acrylic resins or polyester resins or alkyd resins, with silicone resins. The amount of the silicone resin used is not more than 50% by weight, preferably 3 to 45% by weight, based on the total amount of the base resin and the silicone resin. If the content of the silicone resin exceeds 50% by weight, the delamination strength of the resulting coated film with respect to the top coat is reduced, and the resins (A) and (B) completely separate into two layers and the adhesion between the two layers tends to be reduced.

The silicone resins used to modify the base resins are usually organopolysiloxane resins containing at least two reactive groups such as hydroxyl and alkoxy groups in the molecule and preferably having a number average molecular weight of about 500 to about 2,000. Examples include Z-6018 (molecular weight 1,600, produced by Dow Corning Corporation), Z-6188 (molecular weight 650, produced by Dow Corning Corporation), Sylkyd 50 and DC-3037 (produced by Dow Corning Corporation), KR-216, KR-218 and KSP-1 (produced by Shinetsu Silicone Co., Ltd.), TSR-160 and TSR-165 (produced by Toshiba Corporation) and SH5050, SH6018 and SH6188 (produced by Toray Silicone Co., Ltd.).

The silicone-modified resins can be produced by co-condensing the above silicone resins and base resins having a hydroxyl group and/or a carboxyl group, such as acrylic resins or polyester resins, by methods known per se.

The resin (B) should have a surface tension of 25 to 45 dynes/cm, preferably 28 to 40 dynes/cm. If its surface tension is lower than 25 dynes/cm, the delamination strength between the resulting coated film and the top coat is reduced, and the resins (A) and (B) separate completely into two layers and the adhesion between the two layers is reduced. On the other hand, if the surface tension of the resin (B) exceeds 45 dynes/cm, the compatibility of the resin (B) with the resin (A) is excessively good so that it is difficult to form a multi-layered film having the desired concentration gradient. Furthermore, the coated film has poor weatherability and corrosion resistance.

In step (i) of the method of this invention, a multilayered coated film having a concentration gradient may be formed from the cationic electrodeposition paint if the resins (A) and (B) have the surface tensions specified above and the surface tension of the resin (A) is greater than that of the resin (B). It is preferred to select the resins (A) and (B) such that the difference in surface tension between the two resins is at least 5 dynes/cm, preferably 10 to 20 dynes/cm because a multi-layered film can be formed easily and rapidly.

In order to make it easier to form the multi-layered film, the resins (A) and (B) are selected such that they are incompatible or difficultly compatible with each other. That the resins (A) and (B) are "incompatible" or "difficultly compatible" with each other means that a coated film obtained by the following procedure has a light transmittance, determined in the following manner, of 0 to about 70%. Specifically, the resins (A) and (B) are mixed in equal parts by weights and then dissolved in an organic solvent. The solution is uniformly air-sprayed onto a Teflon plate to a film thickness of about 70 microns. The coated film is then baked at a fixed temperature between 160° and 220° C. for a fixed period of time between 15 and 60 minutes and then allowed to cool. The light transmittance of the separated film to ultraviolet light (wavelength about 300 millimicrons) and light in the visible region (wavelength about 500 millimicrons) is measured. When the resins (A) and (B) are "incompatible" or "difficultly compatible" with each other, this light transmittance is 0 to about 70%.

The cationic electrodeposition paint used in step (i) can be prepared by dispersing and/or dissolving the resins (A) and (B) in water by a known method. For example, it can be prepared by (1) dissolving the resins (A) and (B) in a water-miscible organic solvent and mixing the solution with water and an acid (a water-soluble organic acid or inorganic acid such as acetic acid, formic acid, lactic acid, phosphoric acid or sulfuric acid) to neutralize the resins and form an aqueous bath; or (2) dispersing the resin (A) in an aqueous medium to neutralize the resin and form an aqueous bath, and forcibly dispersing a solution of the resin (B) in a water-miscible organic solvent in the aqueous bath by using a homogenizer or the like. By any of the methods (1) and (2), the particles of the resin (B) are covered with the neutralized product of the resin (A) and very stably dispersed in water, and the resulting composition shows excellent storage stability over a long period of time.

In the preparation of the cationic electrodeposition paint used in step (i), each of the resins (A) and (B) may consist of two or more resins. The ratio of resin (A) to resin (B) is from 60:40 to 98:2, preferably from 70:30 to 95:5.

If the ratio is outside the specified range, a multilayered film having an effective concentration gradient cannot be obtained and the resulting film has inferior weatherability or corrosion resistance.

As required, the cationic electrodeposition paint may comprise a colored pigment, a corrosion resistant pigment, an extender pigment and additives normally used in the field of paints in addition to the resins (A) and (B).

When a cationic electrodepositable epoxy resin of the type curable with a curing agent is used as the resin (A), the above composition may contain a predetermined amount of a blocked product of a polyisocyanate compound such as isophorone diisocyanate or 4,4'-diphenylmethane diisocyanate as a curing agent.

Known methods and apparatuses heretofore used for cathodic elecrodeposition coating may be used to applying the cationic electrodeposition paint to a substrate in step (i). Desirably, the substrate is used as the cathode, and a stainless steel plate or a carbon plate, as the anode. The electrodeposition coating conditions are not particularly restricted. Generally, it is desirably carried out with stirring under the following conditions.

Bath temperature: 20° to 30° C.
Voltage: 100 to 400V (preferably 200 to 300V
Current density: 0.01 to 3 A/dm$^2$
Current passing time: 1 to 5 minutes
Electrode area ratio (A/C): 2/1 to ½
Distance between the electrodes: 10 to 100 cm The coated film deposited on the substrate as the cathode preferably has a thickness of 10 to 50 microns, especially 20 to 40 microns, based on the cured coated film. The deposited film is washed, and then baked at about 150° to bout 230° C. for about 10 to 30 minutes whereby it can be cured. As a result of the curing treatment, a multilayered structure is formed in which the epoxy resin [resin (A)] is preferentially distributed in that portion of the structure which makes contact with the metallic substrate and the film-forming resin [resin (B)] is preferentially distributed in the surface portion of the structure. This is presumably because in the heat-melted state, the two resins separate from each other mainly by the difference in surface tension.

The fact that the resulting electrodeposition film has a multilayered structure can be determined by dividing the film into three layers, an uppermost layer, an intermediate layer and a lowermost layer, in the direction of the metal substrate (thickness direction), and calculating the ratio of distribution (content in weight %) of the resin (B) in each of the divided layers. In the electrodeposited primer layer formed from the above cationic electrodeposition paint, the distribution ratio of the resin (B) in the uppermost layer is generally at least 50%, preferably 70 to 95%, and the distribution ratio of the resin (B) in the lowermost layer is not more than 10%, preferably not more than 5%.

(ii) Colored paint

The coated paint to be applied as a first top coat to the cationic electrodeposited film formed in step (i) of the method of this invention is a water-base or organic solvent-base thermosetting paint (preferably water-base) comprising a base resin, a curing agent, a coloring agent and water and/or an organic solvent as main components.

The base resin is a main component of a coated film from the colored paint, and preferably a pain resin having good weatherability and being soluble or dispersible in water and/or an organic solvent. Examples are acrylic resins, polyester resins, epoxy resins and urethane resins.

When these base resins are used as water-base paints, they are generally rendered water-soluble or water-dispersible. In principle, this is achieved by introducing or including an amount, sufficient to render the resins water-soluble or water-dipersible, of a hydrophilic group such as a carboxyl group (—COOH), a hydroxyl group (—OH), a methylol group (—CH$_2$OH), an amino group (—NH$_2$), a sulfone group (—SO$_3$H), or a polyoxyethylene bond $\text{---(CH}_2\text{CH}_2\text{O)}_n\text{---}$. Most generally, the carboxyl group is included, and the resins can be rendered water-soluble or water-dispersible by neutralizing the resins to form alkali salts. The amount of the carboxyl group required for rendering the resins water-soluble or water-dispersible varies depending upon the skeleton of the resins, the content of other hydrophilic groups, the type of the neutralizing agent, and the neutralization equivalent. Generally, it corresponds to an acid value of at least 10, preferably 30 to 200. The water-soluble or water-dispersible resin can generally be rendered water-soluble or water-dispersible by neutralization with alkaline substances such as sodium hydroxide and various amines.

Examples of the above acrylic resins include those having an acid value of 10 to 100 and a hydroxyl value of about 20 to 200 which can be obtained by copolymerizing alpha,beta-ethylenically unsaturated carboxylic acids, (meth)acrylic acid esters having a functional group such as a hydroxyl, amide or methylol group and other (meth)acrylic acid esters, and styrene.

The polyester resins may be obtained by condensing polybasic acids, polyhydric alcohols and modified oils in a customary manner.

The epoxy resins may be, for example, epoxy ester resins obtained by, for example, synthesizing an epoxy ester by reacting the epoxy groups with an unsaturated fatty acid and performing addition reaction between the unsaturated groups of the epoxy ester and an alpha,beta-unsaturated acid, or subjecting the hydroxyl group of an epoxy ester and a polybasic acid such as phthalic acid or trimellitic acid to esterification.

The urethane resins may be, for example, a resin obtained by reacting the aforesaid acrylic resin, polyester resin or epoxy resin with a diisocyanate compound to increase its molecular weight. They are used mainly as water-dispersible resins.

The above resins may be rendered dispersible by emulsion-polymerizing the above monomer components in the presence of a surface-active agent or a water-soluble resin, or by dispersing the above resins in water in the presence of an emulsifier, etc. At this time, the base resin, if desired, does not have to contain the above hydrophilic group at all, or may contain it in an amount smaller than the above water-soluble resin.

Especially preferred as the aqueous dispersion of the acrylic resin is an aqueous dispersion having an average particle diameter of 0.05 to 1.0 micron obtained by polymerizing an acrylic monomer and as required, another copolymerizable monomer in the presence of a nonionic surfactant such as polyoxyethylene nonyl phenyl ether, an anionic surfactant such as polyoxyethylene alkyl allyl ether sulfuric acid ester salt, and dispersion stabilizer for water-soluble resins such as acrylic resins having an acid value of about 20 to 150 and a number average molecular weight of 5,000 to 30,000.

Examples of the acrylic monomer to be polymerized include alpha,beta-ethylenically unsaturated carboxylic acids, for example, monocarboxylic acids such as (meth)acrylic acid, dicarboxylic acids such as maleic acid, fumaric acid and itaconic acid, and half esters of maleic acid and fumaric acid; (meth)acrylates such as methyl (meth)acrylate, ethyl (meth)acrylate, propyl (meth)acrylate, butyl (meth)acrylate and 2-ethylhexyl (meth)acrylate; hydroxy-containing (meth)acrylic acid esters such as hydroxyethyl (meth)acrylate and hydroxypropyl (meth)acrylate; and polymerizable unsaturated monomers such as N-propoxymethyl (meth)acrylamide, N-butoxymethyl (meth)acrylamide and glycidyl (meth)acrylate, styrene and vinyl acetate.

As required, a polyfunctional monomer such as ethylene glycol di(meth)acrylate, 1,6-hexane di(meth)acrylate, trimethylolpropane di(meth)acrylate, allyl (meth)acrylate and trimethylolpropane triacrylate, may be used in a small amount together with the polymerizable unsaturated monomer.

Preferably, the dispersion of the acrylic resin is obtained by a multi-stage polymerization method. An emulsion obtained by a multi-stage polymeriztion process comprising polymerizing a monomer being free from the alpha,beta-ethylenically unsaturated acid or containing a small amount of it and then copolymerizing a monomer containing a large amount of the alpha,-beta-ethylenically unsaturated acid is preferred from the standpoint of coating operation because it can be thickened by neutralization with a neutralizing agent. Examples of the neutralizing agents used include ammonia, and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine. Triethylamine and dimethylethanolamine, which are tertiary amines, are especially preferred. Emulsions obtained by thickening the above emulsion with acrylic resins having a high acid value or thickening agents are also useful for the purpose of this invention.

Advantageously, from the standpoint of mechanical stability and storage stability, the dispersed acrylic resin particles in the aqueous dispersion are crosslinked. If required, water-dispersible polyester resins and polyurethane resins produced by known methods may be used in combination in this aqueous dispersion.

On the other hand, organic solvent-base paint used in step (ii) may be prepared by dissolving or dispersing the aforesaid base resin (it is not necessary to introduce or include the hydrophilic group into it) in organic solvents normally used in paint formulation. Examples of the solvents include hydrocarbons such as toluene, xylene, hexane and heptane; esters such as ethyl acetate, butyl acetate, ethyleneglycol monomethyl ether acetate, diethylene glycol monoethylether acetate and diethylene glycol monobutyl ether acetate; ethers such as hexyl ether, ethylene glycol monomethyl ether, ethylene glycol diethyl ether, diethylene glycol monomethyl ether and diethylene glycol dibutyl ether; alcohols such as butanol, propanol, octanol, cyclohexanol and diethylene glycol; and ketones such as methyl ethyl ketone, methyl isobutyl ketone, cyclohexanone and isophorone.

The organic solvent-base paint may be any of the solution type, the high solid type and the nonaqueous dispersion type.

Curing agents which three-dimensionally crosslink the base resin by heating may be incorporated in the colored paint. Preferred examples include amino resins obtained by condensing or cocondensing melamine, benzoguanamine or urea with formaldehyde, and if desired, futher etherifying the product with a lower monohydric alcohol.

Polyisocyanate compounds (such as tolylene diisocyanate, diphenylmethane diisocyanate, hexamethylene diisocyanate and isophorone diisocyanate) and blocked polyisocyanate compounds (for example, compounds obtained by blocking the isocyanate groups of these polyisocyanates with epsilon-caprolactone, alcohols, or phenols) can also be used conveniently as curing agents.

The ratio between the base resin and the curing agent may be selected according to the purpose. For example, 50 to 90%, especially 70 to 85%, of the base resin and 40 to 10%, especially 30 to 15%, of the curing agent are suitably used on the basis of the total weight of the two.

(a) Metallic pigments, (b) colored pigments, and (c) dyes, for example, may be incorporated in the colored paint used in the method of this invention as coloring agents. The first two are preferred. These pigments will be described below more specifically.

(a) Metallic pigments

The metallic pigments may be, for example, metallic flakes such as aluminum flakes, copper bronze flakes, stainless steel flakes and brass flakes.

Plate-like crystals of phthalocyanine having a long diameter of 5 to 50 microns, preferably 10 to 30 microns, and a short diameter of 1 to 30 microns, preferably 10 to 20 microns, may also be used as the metallic pigment. Examples of phthalocyanine are copper phthalocyanine, cobalt phthalocyanine, tin phthalocyanine, and phthalocyanines containing other metal atoms as coordination metals. One to sixteen halogen atoms such as chlorine or bromine atoms may be substituted at the benzene ring constituting the phthalocyanines. Specific examples of such plate-like crystals of phthalocyanine include Flake Pigment FA7305 (BASF of West Germany).

The phthalocyanine plate-like crystals are semi-transparent, and when light is caused to fall upon the individual crystal grains, the reflected light is of bronze color and the transmitted light is blue. A coated film prepared from a paint containing the phthalocyanine plate-like crystals is of bronze color at the front surface and of a bluish color at the shade.

Conveniently, the phthalocyanine plate-like crystals are used in combination with at least one material selected from colored pigments and mica having a size of not more than 1 micron.

Pigments of achromatic colors and pigments of chromatic colors are examples of the colored pigments having not more than 1 micron. Specific examples of achromatic pigments are titanium dioxide and carbon black. The chromatic pigmants may be any of those chromatic pigments which when mixed in a ratio of 1:1 with titanium dioxide, produce colors having color hues Y, YG, G, BG, B, PB, P or RP on the Munsell color system. Those having as high transparency as possible are preferred. By incorporating the above pigment having a size of not more than 1 micron in the colored paint, the following effect will be obtained. For example, when a coating composition containing the above phthalocyanine plate-like crystals as a coloring component is used, a coated film can be formed which assumes a bronze color at the front and a bluish color at the shade. By positively utilizing the bluishness of the shade and selecting the color of the pigment having a size of not more than 1 micron, a color difference between the front and the shade can further be stressed. In other words, a complementary color relation may be established whereby the front assumes a bronze color and the shade, green.

The mica may be any of those known heretofore. Examples include transparent pearl mica (scaly mica), colored mica (scaly mica coated with iron oxide), and interference mica (scaly mica coated with titanium dioxide). The incorporation of mica produces the following effect. A paint containing the above phthalocyanine plate-like crystals as a coloring agent can only give a coated film having a lightness of 2 to 3 even when it contains no colored pigment. The lightness of the coated film can be increased by simultaneously incorporating a pigment of a high lightness such as titanium dioxide and Azo Yellow, but the glittering of the phthalocyanine plate-like crystals is reduced by the high lightness of their surrounding, and the desired effect of the phthalocyanine crystals tends to be difficult to achieve. If the above mica is incorporated together with the phthalocyanine crystals, only the lightness of the coated film can be advantageously increased without impairing the desired effect. Furthemore, by combining some colored micas of different color tones, a coated film having special color variations can be formed.

It is also possible to use scaly graphite particles as the metallic pigment. The scaly graphite particles are a brilliant pigment having a special black rilliancy, and preferably have a long diameter of 5 to 50 microns and a short diameter of 1 to 30 microns. One specific example is GRAPHITAN 6154 (tradename for a product of Ciba-Geigy).

To adjust lightness or color, the scaly graphite particles may be used, as required, with the above metallic pigment or colored pigments or extender pigments to be described below.

In particular, when the graphite particles are used transparent pearl mica obtained by coating a mica powder with titanium oxide and/or iron oxide, and pearl mica such as colored mica and interference mica (especially those having a long diameter of about 5 to 60 microns and a thickness of about 0.25 to 1 micron), a coated film of a unique pearlescent metallic luster can be formed. Specifically, the light falling upon the coated film from outside produces a pearl-like luster at the pearl mica pigments, and on the other hand, the scaly graphite pigment produces a unique metallic luster. By the interference of the two lights, the pearl-like luster of the pearl mica pigments assumes a vari-colored glitter. The coated film can be finished in a unique pearl-like metallic luster having a feel of depth and varieties with excellent aesthetic appearance.

(b) Colored pigments

Examples of colored pigments which can be incorporated in the water-base or organic solvent-base paint include inorganic pigments such as titanium dioxide, iron oxide, chromium oxide, lead chromate, chrome titanium yellow, cobalt blue and carbon black, and organic pigments such as phthalocyanine blue, phthalocyanine green, carbazole violet, anthrapyrimidine yellow, azo orange, flavanthrone yellow, isoindoline yellow, azo yellow, indathrone blue, dibromoanzathrone red, perylene red, azo red, anthraquinone red, quinacridone red, and quinacridone violet. Extender pigments such as talc, baryta, silica and kaolin may also be incorporated. These pigments preferably have a particle diameter of not more than 1 micron.

(c) Dyes

Dyes that can be incorporated in the colored paint in accordance with this invention have excellent light fastness and excellent solubility in water and organic solvent. Specific examples include azo dyes such as monoazo dyes, polyazo dyes, metal complex salts azo dyes, pyrazolone azo dyes, stilbene azo dyes and thiazole azo dyes; anthraquinone dyes such as anhraquinone derivatives and anthrone derivatives; indigoid dyes such as indigo derivatives and thioindigo derivatives; phthalocyanine dyes; carbonium dyes such as diphenylmethane dyes, triphenylmethane dyes, xanthine dyes and acridine dyes; quinonimine dyes such as azine dyes, oxazine dyes and thiazine dyes; methine dyes such as polymethine (or cyanine) dyes and azimethine dyes; quinoline dyes; nitro dyes; nitroso dyes; naphthoquinone dyes such as benzoquinone; naphthalimide dyes; and perinone dyes. These dyes may be used singly or in combination.

These dyes may be used in combination with at least one of the metallic pigments, colored pigments and extender pigments described above.

The proportions of the above ingredients of the colored paint may be selected as desired according to the purpose. For example, the base resin and the curing agents are used such that the proportion of the former is 60 to 90% by weight, especially 70 to 85% by weight, and the proportion of the latter is 40 to 10% by weight, especially 30 to 15% by weight, based on the total weight of the two components.

The proportion of the coloring agent may be properly selected according to the desired metallic feel and color of the coloring agent and its light transmittance. For example, the suitable amount of the coloring agent is generally 1 to 250 parts by weight, preferably 2 to 150 parts by weight, per 100 parts by weight of the base resin and the curing agent combined. Phthalocyanine plate-like crystals as the metallic pigment may be incorporated in an amount of generally 0.1 to 50 parts by weight, preferably 5 to 45 parts by weight, per 100 parts by weight of the resin solids. The amount of the colored pigments having a size of not more than 1 micron which can be used in combination with it is not more than 50 parts by weight, preferably 0.1 to 20 parts by weight, per 100 parts by weight of the resin solids although it may vary depending upon the type of the colored pigment. For example, when the colored pigment is titanium dioxide, its amount is not more than 10 parts by weight, preferably 0.1 to 5 parts by weight, per 100 parts by weight of the resin solids. Carbon black may be used in an amount of not more than 5 parts by weight, preferably 0.1 to 2 parts by weight, per 100 parts by weight of the resin solids. The amount of the pigment of chromatic color is preferably less than about 20 parts by weight, especially about 1.0 to 10 parts by weight, per 100 parts by weight of the resin solids. The suitable amount of mica is usually less than about 15 parts by weight, preferably about 0.5 to 10 parts by weight, per 100 parts by weight of the resin solids.

When scaly graphite particles are used as the metallic pigment, they are conveniently incorporated in an amount of usually 1 to 40 parts by weight, preferably 10 to 35 parts by weight, per 100 parts by weight of the resin solids. The graphite particles may be used in combination with the colored pigment or mica in the same amounts as stated above with respect to the phthalocyanine plate-like crystals.

The dye may be incorporated in a suitable amount depending upon the desired color. Generally, its amount may be 0.5 to 20 parts by weight, preferably 0.5 to 10 parts by weight, per 100 parts by weight of the resin solids.

The colored paint used in this invention can be prepared by mixing the base resin, the curing agent and the pigment in a customary manner together with deionized water and/or the organic solvent and as required, a thickener, defoamer, etc. and adjusting the solids content of the mixture to about 10 to 40% by weight, and its viscosity to about 800 to 5,000 cps/6 rpm (B-type viscometer).

The colored paint may be coated by spray coating or the like on the surface of the cured electrodeposited film formed in step (i) so that the thickness of the coated film on curing is about 10 to 50 microns.

The powder paint to be described may be directly coated on the surface of the coated film from the colored paint. But prior to it, an additional colored paint may be applied to the coated film of the colored paint. The additional colored paint is a thermosetting paint composed of the aforesaid base resin, curing agent, dye and water and/or the organic solvent as main components and as required various pigments. This additional paint may be coated by spray coating or the like to a cured film thicknss of, for example, about 10 to 50 microns.

Furthermore, a titanium dioxide-coated iron oxide pigment (to be referred to as Ti-MIO) paint may be additionally overcoated on the above coating of the colored paint as part of the first top coat.

The Ti-MIO paint is preferably a paint which contains a Ti-MIO having a longitudinal size (average particle diameter) of 5 to 30 microns and a thickness 1/10 to 1/20 of the longitudinal size formed by coating iron oxide particles containing at least 80% of alpha-iron oxide crystal particles with titanium dioxide and is, in principle, free from the coloring agents described hereinabove. More specifically, this paint is a liquid paint containing the above Ti-MIO, the base resin and the curing agent as principal components and may be waterbase or organic solvent-base.

The base resin and the curing agent are preferably selected from those which have been described hereinabove with regard to the colored paint.

The Ti-MIO is composed of a core of plate-like (hexagonal plate-like) micaceous iron oxide containing alpha-iron oxide ($Fe_2O_3$) crystal grains and a coating of titanium dioxide on its surface. The plate-like micaceous iron oxide forming the core contains at least 80% by weight, preferably at least 90% by weight, more preferably at least 98% by weight, of alpha-$Fe_2O_3$ and contains little or no $SiO_2$ and FeO (less than 2.0% by weight), and has a brilliant shining feel.

The Ti-MIO coated with titanium dioxide is plate-like (hexagonal plate-like). Its longitudinal size is 5 to 15 microns, preferably 10 to 15 microns, and its thickness is 1/10 to 1/20, preferably 1/10 to 1/15, of the longitudinal size. The longitudinal size of the Ti-MIO is measured by a laser-based particle size measuring instrument (PARTICLE SIZER 2200 made by Malvern, England). Most of the longitudinal sizen of the Ti-MIO (for example, at least about 90% by weight, preferably at least 95% by weight) is distributed in 30 microns or below. The "longitudinal size (average central particle diameter) of 5 to 15 microns" means that the Ti-MIO contains at least 40% by weight, preferably at least 50% by weight, of particles having a size in this range. The "longitudinal size of preferably 10 to 15 microns" means that Ti-MIO preferably contains at least 25% by weight, especially at least 32% by weight, of particles having a size within this range. It is important that the content of particles having a size greater than 15 microns and less than 30 microns in the Ti-MIO should be not more than 45% by weight, especially not more than 43% by weight, based on the entire Ti-MIO.

Titanium dioxide coating the surface of the iron oxide particles is generally of the anatase type. Use of rutile titanium dioxide increases weatherability.

The proportion of the titanium dioxide layer in the Ti-MIO is preferably 0.1 to 30% by weight, especially 0.3 to 30% by weight, based on the entire weight of the Ti-MIO.

The Ti-MIO can be obtained by heat-treating the iron oxide particles in a solution of a metal oxide or hydroxide, such as titanil sulfate ($TiOSO_4.5.2H_2O$), titanium tetrachloride and zironium sulfate [$Zr(SO_4)_2.4H_2O$], washing the treated product with water, and then drying it. The weatherability and luster of the product can be improved by calcining it at about 600° C. to crystallize it. Its color may be changed by heat-treating the product with, for example, aluminum sulfate, $Al_2(SO_4)_3.18H_2O$. The color of the Ti-MIO so obtained can be adjusted to a desired one by the aforesaid treating agent and treating method. For example, it can be toned to blue, greenish blue, yellow, purple, red purple, red brown, greenish brown and gold, and its surface has excellent brightness.

The amount of the Ti-MIO incorporated is preferably 0.1 to 30 parts by weight, especially 5 to 20 parts by weight, per 100 parts by weight of the vehicle component (the total solids of the base resin and the curing agent).

There is no particular restriction on the method of dispersing the Ti-MIO in the vehicle component. Preferably, strong dispersion is avoided so as not to destroy the coated titanium dioxide layer. This can be easily accomplished by an ordinary disper stirring device.

As required, ordinary metallic pigments, colored pigments, extender pigments and paint additives may also be incorporated in the Ti-MIO-containing paint composed of the Ti-MIO and the vehicle component as main components, in amounts which do not impair the excellent aesthetic characteristics of the Ti-MIO.

The Ti-MIO-containing paint may be coated by spray coating or the like to a cured film thickness of, for example, about 5 to 40 microns.

When the Ti-MIO-containing paint is to be overcoated, the colored paint as an undercoat for it is desirably a liquid paint capable of forming a coated film which has an average light transmittance to light of wave lengths 400 to 700 nm of not more than 5% when its cured film thickness is 30 microns.

The "light transmittance", as used in the present specification, is measured at a wavelength of 400 to 700 nm by a self-recording specrophotometer (Model EPS-3T made by Hitachi Limited) on a sample prepared by coating the colored paint on a glass plate, curing the coated film, peeling the coated film while the coated glass plate is immersed in hot water at 60° to 70° C., and then drying the peeled film. When the measured values differ with the wavelenths (400 to 700 nm) at which the measurement is done, the maximum measured value is recorded.

Preferably, the coated film from the colored paint has a lightness of not more than 6 based on the Munsell value (V) because at this lightness, the Ti-MIO in the Ti-MIO-containing paint can fully exhibit its brightness.

(iii) Powder paint

The powder paint to be coated on the colored film of the colored paint may be a known thermosetting powder paint which can form a transparent coated film that permits viewing of the colored coated film beneath. It may contain a coloring agent in an amount which does not substantially impair the transparency of the resulting film. It is composed of a base resin and a curing agent as main components, preferably being substantially free from a coloring agent.

The base resin is a principal component for forming a coated film of the powder resin. Examples are acrylic resins, polyester resins, fluorine resins, urethane resins and modification products thereof (for example, graft copolymers) having at least one crosslinkable functional group selected from, for example, hydroxyl, carboxyl and glycidyl groups. Preferably, the base resin has a glass transition temperature of generally at least 50° C., especially 60° to 120° C., and may have any desired composition and molecular weight selected according to the purpose.

The curing agent is a component for three-dimensionally crosslinking the base resin by heating, and may include, for example, alkoxymethylolmelamines, blocked polyisocyanate compounds, epoxy compounds, isocyanurate compounds and aliphatic dibasic acids.

The ratio between the base resin and the curing agent is most preferably such that the mole ratio of the functional group of the base resin and the functional group of the curing agent is nearly 1:1.

The powder paint may further contain paint additives such as a flow adjusting agent, an ultraviolet absorber and a light stabilizer.

When it is desired to form a colored coated film from the powder resin, it is necessary, for securing the transparency of the coated film, to incorporate a coloring agent such that the average light transmittance to visible light of 400 to 700 nm at a cured film thickness of 60 microns of 30 to 90%, preferably 50 to 75%.

Use of the colored powder paint can give a finished appearance having high hiding power, excellent smoothness, excellent luster, excellent distinctness of image gloss, transparency, high chroma, and aesthetic characteristics heretofore unobtainable.

The coloring agent used for this purpose may be any of those exmplified hereinabove with regard to the colored paint, and preferably has a color identical with or similar to the colored paint of the first top coat. This is, however, not limitative, and a metallic pigment may also be used in combination.

The amount of the coloring agent incorporated may be selected according to the purpose. Suitably, it is generally 0.3 to 50 parts by weight, preferably 1 to 35 parts by weight, per 100 parts by weight (solids) of the base resin and the curing agent combined.

When the colored powder paint is used, the colored paint as the first top coat is desirably one which can form a transparent coated film having an average light transmittance to visible light having a wavelength of 400 to 700 nm at a film thickness of 20 microns of not more than 5%, preferably not more than 3%.

The powder paint is obtained usually by meltkneading the aforesaid components, cooling the mixture and then pulverizing it. These steps and the particle diameter of the powder paint may be the same as in the prior art.

The powdered paint is applied to the surface of the uncured coated film of the aforesaid colored paint after it is air dried at room temperature or below 100° C. to remove most or all of the water or organic solvent contained in it without being heat-cured. Alternatively, the powder paint may be applied after the coated film of the colored paint is cured by heating to 120° to 200° C., for example. There is no particular restricton on the method of coating the powder paint, and any known powder coating methods such as electrostatic spray coating or fluidized dipping may be employed.

There is no particular restriction on the thickness of the coated film of the powder paint. Generally, its suitable thickness is, for example, 40 to 200 microns. To better the smoothness, distinctness of image gloss, luster and fatness of the finished coated film, it is preferably coated thick, generally to a thickness of 40 to 200 microns, preferably 60 to 120 microns.

The coated film is dried by heating it to a curing temperature, for example 120° to 200° C., especially 120° to 170° C.

The method of this invention described hereinabove is simplified in steps involved, gives a very good surface finish, and is advantageous for resources saving and pollution control. It can be widely used in coating automobiles, bicycles, electrical appliances, etc.

The following Examples and Comparative Examples specifically illustrate the present invention. All parts and percentages in these examples are by weight.

I. PREPARATION OF SAMPLES

Cationic electrodeposition paint used in step (i)
(A) Cationic electrodepositable epoxy resin

| | |
|---|---|
| (1) bisphenol-type epoxy resin ("Araldite #6071", Ciba-Geigy) | 930 parts |
| (2) bisphenol-type epoxy resin ("Araldite GY 2600", Ciba-Geigy) | 380 |
| (3) Polycaprolactonediol ("Placcel #205", Daicel Chemical Industries, Ltd.) | 550 |
| (4) Dimethylbenzylamine acetate | 2.6 |
| (5) p-Nonylphenol | 79 |
| (6) Monoethanolamine ketiminized with methyl isobutyl ketone | 71 |
| (7) Diethanolamine | 105 |
| (8) Butyl Cellosolve | 180 |
| (9) Cellosolve | 525 |

The above ingredients (1) to (6) were reacted together at 150° C. for 2 hours, and then the ingredients (7) to (9) were mixed and reacted at 80° to 90° C. for 3 hours to form a resin solution having a solids content of 75%. This resin had a surface tension of 53 dynes/cm (B) Preparation of a nonionic film-forming resin

| Production of (B-1) | |
|---|---|
| (1) Butyl Cellosolve | 26 parts |
| (2) 80% Polyester monomer ("FM-3X" made by Daicel Chemical Industries, Ltd.) | 37.5 |
| (3) Styrene | 40 |
| (4) Hydroxyethyl methacrylate | 25 |
| (5) n-Butyl methacrylate | 5 |
| (6) Azobisisobutyronitrile (AIBN) | 4 |
| (7) Butyl Cellosolve | 5 |
| (8) Azobisdimethylvaleronitrile | 0.5 |
| (9) Cellosolve | 23 |

The ingredient (1) was heated to 130° C., and the ingredients (2) to (6) were added dropwise at 130° C. over the course of 5 hours. The mixture was maintained at 130° C. for 2 hours. Then, the components (7) and (8) were added dropwise over two hours at 130° C. Furthermore, the mixture was maintained at 130° C. for 2 hours, and then the ingredient (9) was added, and the mixture was cooled. Thus, there was obtained a resin solution having a solids content of 62%, a number average molecular weight of about 5,000 and a surface tension of 40 dynes/cm.

| Production of (B-2) | |
|---|---|
| (1) Butyl Cellosolve | 26 parts |
| (2) 80% Polyester monomer ("FM-3X", a product of Daicel Chemical Industries, Ltd.) | 87.5 |
| (3) Sytrene | 25 |
| (4) Hydroxyethyl acrylate | 5 |
| (5) AIBN | 4 |
| (6) Butyl Cellosolve | 5 |
| (7) Azobisdimethylvaleronitrile | 0.5 |
| (8) Cellosolve | 23 |

The ingredient (1) was heated to 130° C., and the ingredients (2) to (5) were added dropwise at 130° C. over the course of 5 hours. The mixture was maintained at 130° C. for 2 hours, and the ingredients (6) and (7) were added dropwise at 130° C. over the course of 2 hours. The mixture was further maintained at 130° C. for 2 hours, and then the ingredient (8) was added, followed by cooling. There was obtained a resin solution having a solids content of 62%, a number average molecular weight of about 5,000 and a surface tension of 35 dynes/cm.

Production of an emulsion

| | |
|---|---|
| (1) Resin solution mixture [the mixture of (A) and (B) in the ratio shown in Table 1 below] (as solids) | 82.6 parts |
| (2) 4,4'-diphenylmethane diisocyanate blocked with ethylene glycol mono-2-ethylhexyl ether | 5.0 |
| (3) isophorone diisocyanate blocked with methyl ethyl ketone ketoxime | 12.4 |
| (4) Polypropylene glycol 4000 | 0.5 |
| (5) Lead acetate | 1.0 |
| (6) 10% acetic acid | 9.3 |
| (7) Deionized water | 185.75 |

The ingredients (1) to (4) were uniformly mixed, and the ingredients (5) and (6) were added. They were uniformly mixed, and the ingredient (7) was added and mixed uniformly with stirring. Thus, an emulsion having a non-volatile content of 32% (120° C., 1 hr.) was obtained.

Production of pigment paste

| | |
|---|---|
| 60% quaternized epoxy resin (dispersion medium) | 5.73 parts |
| Titanium dioxide | 14.5 |
| Carbon | 0.54 |
| Clay (extender pigment) | 7.0 |
| Lead silicate | 2.3 |
| Dibutyltin oxide | 2.0 |
| Deionized water | 27.49 |

A pigment paste having a non-volatile content of 50% (120° C., 1 hr.) was obtained from the above ingredients.

Production of a cation elecrodeposition paint

A cationic electrodeposition bath (solids content 20%) was prepared by mixing 317.2 parts of the emulsion obtained by mixing the components (A) and (B) above in the mixing ratio (as weight solids of the resins), 59.56 parts of the pigment paste and 279.64 parts of deionized water.

TABLE 1

| | (i)-1 | (i)-2 |
|---|---|---|
| Component (A) | 90 | 85 |
| Component (B-1) | 10 | — |
| Component (B-2) | — | 15 |

First top coat paint used in step (ii)

(ii)-1: Water-base metallic paint

Production of aqueous dispersion of acrylic resin (W-1)

Deionized water (140 parts), 2.5 parts of 30% Newcol 707SF and 1 part of the following monomeric mixture (1) were introduced into a reaction vessel and mixed with stirring in a steam of nitrogen, and at 60° C. 3 parts of 3% ammonium persulfate was added. The temperature was then raised to 80° C., and then a monomer emulsion composed of 79 parts of the following monomeric mixture (1), 2.5 pats of 30% Newcol 707SF, 4 parts of 3% ammonium persulfate and 42 parts of deionized water was added to the reaction vessel by means of a metering pump over the course of 4 hours. After the addition, the mixture was aged for 1 hour.

Furthermore, 20.5 parts of the following monomeric mixture (2) and 4 parts of a 3% aqueous solution of ammonium persulfate were added dropwise at 80° C. simultaneously side by side over 1.5 hours. After the addition, the mixture was aged for 1 hour, and filtered through a 200-mesh nylon cloth at 30° C. Deionized water was added to the filtrate, and the mixture was adjusted to pH 7.5 with dimethylaminoethanol to give an aqueous dispersion of acrylic resin W-1 having an average particle diameter of 0.1 micron, a glass transition temperature (Tg) of 46° C. and a non-volatile content of 20%.

| Monomeric mixture (1) | |
|---|---|
| Methyl methacrylate | 55 parts |
| Styrene | 10 |
| n-Butyl acrylate | 9 |
| 2-Hydroxyethyl acrylate | 5 |
| Methacrylic acid | 1 |
| Monomeric mixture (2) | |
| Methyl methacrylate | 5 parts |
| n-Butyl acrylate | 7 |
| 2-Ethylhexyl acrylate | 5 |
| Methacrylic acid | 3 |
| 30% Newcol 707SF | 0.5 |

(°): 30% Newcol 707SF is a tradename for a surfactant produced by Japan Emulsion Co., Ltd.

Production of aqueous solution of acrylic acid (W-2)

Butyl Cellosolve (60 parts) and 15 parts of isobutyl alcohol were introduced into a reaction vessel, and heated to 115° C. in a stream of nitrogen. When the temperature reached 115° C., a mixture of 26 parts of n-butyl acrylate, 47 parts of methyl methacrylate, 10 parts of styrene, 10 parts of 2-hydroxyethyl methacrylate, 6 parts of acrylic acid and 1 part of AIBN was added over 3 hours. After the addition, the mixture was aged at 115° C. for 30 minutes, and a mixture of 1 part of AIBN and 115 parts of butyl Cellosolve was added over the course of 1 hour. After aging for 30 minutes, the mixture was filtered through a 200-mesh nylon cloth at 50° C.

The resulting product had an acid value of 48, a viscosity of $Z_4$ (Gardener bubble viscometer), a nonvolatile content of 55% and a Tg of 45° C. The product was neutralized with dimethylaminoethanol and deionized water was added to give a 50% aqueous solution of acrylic resin.

Water-base metallic paint

| Aqueous dispersion of acrylic resin (W-1) | 275 parts |
|---|---|
| Aqueous solution of acrylic resin (W-2) | 40 |
| Cymel 350 (methanol-modified amino resin made by Mitsui Toatsu Chemical Co., Ltd.) | 25 |
| Aluminiumpaste AW-500B (made by Asahi Kasei Metals Ltd.) | 20 |
| Butyl Cellosolve | 20 |
| Deionized water | 253 |

The above ingredients were mixed, and Thixol K-130B (a thickener made by Kyoeisha Chemical Co., Ltd.) was added and the viscosity of the mixture was adjusted to 3000 cps by a B-type viscometer (rotor rotating speed 6 rpm) to give a water-base metallic paint having a non-volatile content of about 19%.

(ii)-2: Water-base white paint

| Aquous solution of acrylic resin | 40 parts |
|---|---|
| (W2) | |
| Titanium dioxide | 100 |
| Butyl Cellosolve | 20 |

The above ingredients were dispersed to a particle size of not more than 5 microns by a pebble

| Aqueous dispersion of acrylic resin (W-1) | 275 |
|---|---|
| Cymel 350 | 25 |
| Deionized water | 111 |

The above ingredients were added and the viscosity of the mixture water-base was adjusted to 2500 cps to give a white pigment having a solids content of about 30%.

(ii)-3 to 5: Dye-containing paint

In accordance with the formulations shown in Table 2, first top coat paints were prepared in a customary manner (ii)-3 and (ii)-4 were of organic solvent-base, and (ii)-5 was of water-base]. In the organic solvent-base paints, an equal weight mixture of toluene and xylene was used.

TABLE 2

| | | (ii)-3 | (ii)-4 | (ii)-5 |
|---|---|---|---|---|
| Base resin | Almatex 884-2 (°1) | 70 | 70 | — |
| | Almatex WP640 (°2) | — | — | 80 |
| Curing agent | Uban 20SE (°3) | 30 | 30 | — |
| | Cymel 350 | — | — | 20 |
| Dye | Valiosol Red 3304-T (°4) | 0.8 | — | — |
| | Savinyl Blue RS (°5) | — | 1.5 | — |
| | Red 2W-LIQ (°6) | — | — | 0.8 |
| Pigment | Fuji Red 7R3300E (°7) | 8 | — | 6 |

Note to Table 2
(°1): a tradename for an organic solvent-base acrylic resin made by Mitsui Toatsu Chemicals, Inc.
(°2): a tradename for a water-base acrylic resin made by Mitsui Toatsu Chemicals, Inc.
(°3): a tradename for a butanol-mofified melamine resin made by Mitsui Toatsu Chemicals, Inc.
(°4): a tradename for a dye made by Orient Chemical Industry, Ltd.
(°5): a tradename for a dye made by Sandoz AG.
(°6): a tradename for a dye made by Hodogaya Chemical Co., Ltd.
(°7): a tradename for a pigment made by Fuji Pigment Co., Ltd.

The amounts are as solids (parts).

(ii)-6: Organic solvent-base metallic paint

A monomeric mixture composed of 15% of styrene, 15% of methyl methacrylate, 40% of butyl methacrylate, 13% of 2-ethylhexyl acrylate, 15% of hydroxyethyl methacrylate and 2% of acrylic acid was copolymerized in xylene using azobisisobutyronitrile as a polymerization initiator to give an acrylic resin solution having an acid value of 80, a viscosity of Y (Gardener, 25° C.) and a residue on heating of 50%.

A metallic base coat was prepared in accordance w ith the following formulation.

| 50% acrylic resin solution prepared as above | 140 parts |
|---|---|
| 55% melamine/formaldehyde resin (°1) | 50 |
| Aluminiumpaste A (°2) | 20 |
| Aluminiumpaste B (°3) | 10 |
| Organic blue pigment (°4) | 2 |

-continued

| | 222 parts |
|---|---|

(*1): Uban 28SE
(*2): Aluminiumpaste #4919, tradename for a product of Toyo Aluminum K. K.
(*3): Aluminumpaste #55-519, tradename for a product of Toyo Aluminum K. K.
(*4): Palomer Blue B 4806, a tradename for a pigment made by Bayer AG, West Germany The above ingredients were mixed and dispersed and then dissolved in a mixed solvent composed of 35 parts of ethyl acetate, 35 parts of toluene, 10 parts of isobutanol and 20 parts of Swazol #1000 (a tradename for a product of Cosmo Oil Co., Ltd.) to a viscosity of 14 seconds (Ford cup No. 4/30° C.) to prepare a metallic base coat.

(ii)-7 and 8: Water-base colored paints

These paints were prepared in acordance with the formulations shown in Table 3 using (W-1) and (W-2) of (ii)-1.

TABLE 3

| | (ii)-7 | (ii)-8 |
|---|---|---|
| Pigment paste | | |
| (W-2) | 40 | 40 |
| Titanium White CR93 (*1) | 150 | 80 |
| Carbon MA (*2) | 0.2 | 0.1 |
| Mapico Yellow XLO (*3) | | 1.5 |
| Cellosolve | 20 | 20 |
| Ingredient for paint formulation | | |
| (W-1) | 275 | 275 |
| Cymel 350 | 25 | 25 |
| Deionized water | 111 | 111 |
| Visible light transmittance (%) (*4) | 2.5 | 3.0 |

In Table 3:
(*1): a tradename, Ishihara Sangyo Kaisha Ltd.
(*2): a tradename, Mitsubishi Chemical Industries, Ltd.
(*3): a tradename, Toda Industry, Co., Ltd.
(*4): Measured by the method described hereinabove except that the cured coated film on the glass plate had a thickness of 20 microns.

In Table 3:

(*1): a tradename, Ishihara Sangyo Kaisha Ltd.

(*2): a tradename, Mitsubishi Chemical Industries, Ltd.

(*3): a tradename, Toda Industry, Co., Ltd.

(*4): Measured by the method described hereinabove except that the cured coated film on the glass plate had a thickness of 20 microns.

The components of the pigment paste were dispersed to a particle size of not more than 5 microns by a pebble mill, and the ingredients for paint formation were mixed. Furthermore, Thixol K-130B was added to form a paint having a viscosity of 2500 cps measured by a B-type viscometer (rotor rotating speed 6 rpm).

(ii)-9 and 10: Organic solvent-base colored paints

TABLE 4

| | | (ii)-9 | (ii)-10 |
|---|---|---|---|
| Base resin | Almatex 884-2 (*1) | 70 | 75 |
| Curing agent | Uban 20SE (*2) | 30 | 25 |
| Pigment | Fuji Red 7R3300E (*3) | 6 | — |
| | Cyanine Blue-5240K (*4) | — | 5 |
| Visible light transmittance | | 0.8 | 1.0 |

TABLE 4-continued

| | (ii)-9 | (ii)-10 |
|---|---|---|
| (%) (*5) | | |

Note to Table 4:
(*1): a tradename, Mitui Toatsu Chemicls, Inc.
(*2): a tradename, Mitui Toatsu Chemicls, Inc.
(*3): a tradename, Fuji Pigment Co., Ltd.
(*4): a tradename, Dainichiseika Color & Chemicals Mfg., Co., Ltd.
(*5): Same as (*4) in Table 3.

Note to Table 4:

(*1): a tradename, Mitui Toatsu Chemicals, Inc.

(*2): ditto (*3): a tradename, Fuji Pigment Co., Ltd.

(*4): a tradename, Dainichiseika Color & Chemicals Mfg., Co., Ltd.

(*5): Same as (*4) in Table 3.

The above ingredients were mixed and dispersed a customary manner, and the viscosity of the resulting paint was adjusted with an equal amount mixture of toluene and xylene. The amounts indicated above were as solids.

(ii)-11 and 12: Ti-MIO-containing paint (water base)

| Aqueous dispersion of acrylic resin (W-1) | 275 parts |
|---|---|
| Aqueous solution of acrylic resin (W-2) | 40 |
| Cymel 350 | 25 |
| Ti-MIO (Table 5) | |
| Butyl Cellosolve | 20 |
| Deionized water | 353 |

The above ingredients were mixed, and Thixol K-130B was added, and the viscosity of the mixture was adjusted to 3000 cps using a B-type viscometer (rotor rotating speed 6 rpm) to obtain a Ti-MIO-containing water-base paint. The paint containing M-1 is designated as (ii)-11, and the paint containing M-2, as (ii)-12.

(W-1) and (W-2) were the same as those described with regard to (ii)-1.

TABLE 5

| | M-1 | M-2 |
|---|---|---|
| Composition of Ti-MIO | | |
| Iron oxide particles | | |
| Alpha-Fe$_2$O$_3$ content (%) | 99.3 | 99.3 |
| FeO content (%) | 0.1 | 0.1 |
| Mn content (%) | 0.6 | 0.6 |
| Titanium dioxide coating Content (%) | 8.2–10.1 | 9.6–11.3 |
| Longitudinal size | | |
| 5–16 micron particle content (wt. %) | 55.2 | 55.2 |
| Thickness (micons) | 0.4–1.0 | 0.7–1.0 |
| Amount (parts) of the Ti-MIO added | 13 | 13 |

(ii)-13: Ti-MIO-containing paint (organic solvent-base)

| 50% acrylic resin (*1) | 150 parts |
|---|---|
| 88% Cymel 370 (*2) | 28 |
| Pigment component (M-1 in Table 5) | 10 |
| Dibutyl acid phosphate | 0.3 |

(*1): The 50% acrylic resin solution was prepared by polymerizing 30 parts of methyl methacrylate, 59 parts of ethyl acrylate, 10 parts of hydroxyethyl acrylate and 1 part of acrylic acid in a mixed solvent of xylene and n-butanol in a weight ratio of 70/30 using alpha,alpha'-azobisisobutyronitrile as a polymerization initiator. It had an average molecular weight of 25,000 and a resin solids content of 50%.
(*2): 88% Cymel 370

The above ingredients were mixed, and adjusted to a viscosity of 13 seconds (Ford cup No. 4/20° C.) with a mixed solvent composed of 30 parts of toluene, 20 parts of isobutyl alcohol, 30 parts of Cellosolve acetate and 20 parts of butyl Cellosolve.

A tradename of Mitsui Cyanamid Co., containing 55%, as solids, of a mononuclear product of methoxylated methylolmelamine containing both a methoxy group and a methylol group.

(ii)-14: Water-base paint containing phthalocyanine plate-like crystals

| Aqueous dispersion of acrylic resin (W-1) | 275 parts |
| Aqueous solution of acrylic resin (W-2) | 40 |
| Cymel 350 | 25 |
| Flake Pigment FA7305 | 25 |
| Carbon black | 0.5 |
| Butyl Cellosolve | 20 |
| Deionized water | 253 |

These ingredients were mixed, and Thixol K-130B was added, and the viscosity of the mixture was adjusted to 3000 cps using a B-type viscosity (rotor rotating speed 6 rpm). The non-volatile content of the resulting paint was 19%.

(ii))-15: Organic solvent-base paint containing phthalocyanine plate-like crystals

| 50% acrylic resin solution (*1) | 110 parts |
| 88% Cymel 370 (*2) | 28 |
| Flake Pigment FA7305 | 23 |
| Carbon black | 0.1 |
| Perylene Red (Paliogen Red L3920, BASF) | 11 |
| Dibutyl acid phosphate | 0.3 |

Notes
(*1) and (*2) are the same as for (ii)-13.

The above mixture was adjusted to a viscosity of 13 seconds (Ford cup No. 4/20° C.) with a mixed solvent composed of 39 parts of toluene, 20 parts of isobutyl alcohol, 30 parts of Cellosolve acetate and 20 parts of butyl Cellosolve.

(ii)-16: Organic solvent-base paint containing scaly graphite particles

| 50% acrylic resin solution (*1) | 140 parts |
| 88% Cymel 370 (*2) | 34 |
| Graphitan | 25 |
| White pearl mica (*3) | 5 |
| Dibutyl acid phosphate | 0.3 |

(*1) and (*2) were the same as for (ii)-13.
(*3): Bright White 139X, Mearl Corporation (*1) and (*2) were the same as for (ii)-13.
(*3): Bright White 139X, Mearl Corporation A mixture of the above was adjusted to a viscosity of 13 seconds (Ford cup No. 4/20° C.) with a mixed solvent composed of 30 parts of toluene, 20 parts of isobutyl alcohol, 30 parts of Cellosolve acetate and 20 parts of butyl Cellosolve.

(ii)-17: Water-base paint containing scaly graphite particles

| Aqueous dispersion of acrylic resin (W-1) | 275 parts |
| Aqueous solution of acrylic resin (W-2) | 40 |
| Cymel 350 | 25 |
| Scaly graphite (Graphitan 6154, a product of Ciba-Geigy) | 20 |
| Butyl Cellosolve | 20 |
| Deionized water | 253 |

The above ingredients were mixed, and Thixol K-130B was added. The mixture was adjusted to 3000 cps by a B-type viscometer (rotor rotating speed 6 rpm) to give a water-base metallic paint having a non-volatile content of about 19%.

(w-1) and (W-2) were the same as used in preparing (ii)-1.

Powder paints used in step (iii)

(iii)-1: Transparent powder paint

Forty parts of methyl methacrylate, 30 parts of 2-ethylhexyl acrylate, 30 parts of glycidyl methacrylate, 10 parts of styrene, 1 part of t-butyl peroxide (polymerization initiator), and 2 parts of potassium oleate soap (surfactant) were introduced into a flask, and polymerized under heat by a suspension polymerization technique. The resulting particulate copolymer having a glass transition temperature of about 60° C. was dried One hundred parts of the resulting copolymer, 25 parts of decamethylenedicarboxylic acid and 1 part of a coat surface adjusting agent were melt-kneaded at 20° C. for 10 minutes using a hot kneader. The kneaded mixture was then cooled, and then pulverized by a pulverizer to give a clear powder paint having a particle diameter of about 20 to 150 microns.

(iii)-2 and 3: Colored transparent powder paints

The ingredients described in Table 6 were pre-mixed by a Henschel mixer and then melt-kneaded by a BUSS-Kokneader. The mixture was cooled, and then pulverized to give a colored clear powder paint having a particle diameter of 20 to 150 microns.

TABLE 6

|  | (iii)-2 | (iii)-3 |
| --- | --- | --- |
| Almatex PD6730 (*1) | 100 | 100 |
| Titanium White CR93 (*2) | 5 | 5 |
| Mapico Yellow XLO (*3) | — | 0.1 |
| Dodecanedioic acid | 25 | 25 |
| TINUVIN 900 (*4) | 1 | 1 |
| Silicone-type extender (*5) | 0.1 | 0.1 |
| Visible light transmittance (%) (*6) | 75 | 70 |

Note to Table 6
(*1), (*2) and (*3): described hereinabove
(*4): a tradename for an ultraviolet absorber made by Ciba-Geigey.
(*5): produced by Shinetsu Chemical Co., Ltd.
(*6): Same as in (*5) in Table 4 except that the thickness of the cured film was changed to 60 microns.

EXAMPLES AND COMPARATIVE EXAMPLES

An iron article treated with zinc phosphate was immersed in the cationic electrodeposition paint bath in step (i), and an electric current was passed across it and an anode as a counterelectrode for three minutes at such a voltage as to provide a film thickness of 20 microns after baking. The coated article was washed with water and heated at 170° C. for 20 minutes to cure the electrodeposited film. Then, the first top coat in step (ii) was applied to the electrodeposited film, and then a powder paint as the second top coat in step (iii) was applied by an electrostatic powder coating method so that the coated film had a thickness of 70 to 100 microns upon curing.

The paints, film thicknesses and the drying or baking conditions used in these steps are shown in Table 7. The properties of the resulting coated films are also shown in Table 7.

What we claim is:
1. A coating method, which comprises:
   (i) applying to a substrate a multi-layer film-forming cationic electrodeposition paint comprising
      (A) a cationic electrodepositable epoxy resin having a surface tension of 40 to 60 dynes/cm and

TABLE 7

| | | | Example |||||||||||||
|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Coating steps | Electro-deposition (i) | Paint | 1 | 2 | 1 | 2 | | | | 1 | | | | 2 | |
| | | Film thickness | | | | | | | | 20μ | | | | | |
| | | Heating | | | | | | | 170° C., 20 min. | | | | | | |
| | First top coating (ii) | Paint | | 1 | 2 | 17 | 3 | 4 | 5 | 6 | 7 | 8 | | 9 | |
| | | Film thickness (μ) | | 15 | | 35 | | | | 30 | | | | 25 | |
| | | Heating | | 80° C., 5 min. | | | | | 100° C., 20 min. | | | | | 80° C., 5 min. | |
| | | Paint | | | | | | | | 3 | 5 | | | 11 | 12 |
| | | Film thickness (μ) | | | | | | | | 30 | | | | 15 | |
| | | Heating | | | | | | | | 100° C., 20 min. | | | | 80° C., 5 min. | |
| | Second top coating (iii) | Paint | | | | | 1 | | | | | | | 2 | |
| | | Film thickness (μ) | | | | 90 | | | | 80 | | | | 90 | |
| | | Heating | | | | | | | 150° C., 30 min. | | | | | | |
| Test results | Gloss retention of the electrodeposited film (*2) | | 99 | 98 | 98 | 99 | 98 | 99 | 98 | 98 | 97 | 99 | 98 | 99 | 99 |
| | Adhesion of the accelerated exposure (*3) | | | | | | | | | | | | | | |
| | Appearance after accelerated exposure (*4) | | | | | | | | | | | | | | |
| | Sharpness (*5) | | 1.0 | 1.0 | 1.0 | 1.0 | 1.0 | 1.0 | 1.0 | 1.0 | 1.0 | 1.0 | 1.0 | 1.0 | 1.0 |
| | Finished appearance (*6) Smoothness | | | | | | | | | | | | | | |

| | | | Example |||||Comparative Example|||||||
|---|---|---|---|---|---|---|---|---|---|---|---|---|---|---|
| | | | 14 | 15 | 16 | 17 | 18 | 1 | 2 | 3 | 4 | 5 | 6 | 7 |
| Coating steps | Electro-deposition (i) | Paint | | | 2 | | | | | Conventional (*1) | | | | |
| | | Film thickness | | | 20 | | | | | 20μ | | | | |
| | | Heating | | | 170° C., 20 min. | | | | | 170° C., 20 min. | | | | |
| | First top coating (ii) | Paint | 10 | 14 | 15 | | 16 | 1 | 3 | 6 | 7 | 9 | 14 | 16 |
| | | Film thickness (μ) | 25 | | | 20 | | 15 | | 30 | | 25 | | 20 |
| | | Heating | | 80° C., 5 min. | | | | 80° C., 5 min. | | 100° C., 20 min. | | 80° C., 5 min. | | |
| | | Paint | 12 | 13 | | | | | | 3 | | 11 | | |
| | | Film thickness (μ) | 15 | | | | | | | 30 | | 15 | | |
| | | Heating | 80° C., 5 min. | | | | | | | 100° C., 20 min. | | 80° C. 5 min. | | |
| | Second top coating (iii) | Paint | | | 2 | | | | | | | | | |
| | | Film thickness (μ) | | | 90 | | | | | | | | | |
| | | Heating | | | 150° C., 30 min. | | | | | | | | | |
| Test results | Gloss retention of the electrodeposited film (*2) | | 99 | 98 | 98 | 98 | 99 | 30 | 30 | 30 | 30 | 30 | 30 | 30 |
| | Adhesion of the accelerated exposure (*3) | | | | | | | X | X | X | X | X | X | X |
| | Appearance after accelerated exposure (*4) | | | | | | | X | X | X | X | X | X | X |
| | Sharpness (*5) | | 1.0 | 1.0 | 1.0 | 1.0 | 1.0 | 0.5 | 0.5 | 0.5 | 0.5 | 0.5 | 0.5 | 0.5 |
| | Finished appearance (*6) Smoothness | | | | | | | Δ | Δ | Δ | Δ | Δ | Δ | Δ |

Note to Table 7

(*1): The conventional electrodeposition paint was prepared in the same way as in the preparation of the cationic electrodeposition paint used in step (i) of the invention except that component (B) was not incorporated. It was coated and cured as in (I)-1.

(*2): The gloss retention of the electrodeposited film was determined as follows: The heat-cured coated plate was subjected to accelerated exposure to a sunshine weather-ometer (1100 K joules/m$^2$ · hr) for 40 hours, and the percent change of gloss (60° specular reflectance) after exposure was examined as against the gloss before exposure. The glosses in the intital stage (before exposure) and after 40 hours exposure were measured by a digital gloss meter (GM-26D supplied by Murakami Color Technology Laboratory). The gloss retention was calculated from the following equation.

$$\text{Gloss retention (\%)} = \frac{60\% \text{ gloss after 40-hour exposure}}{\text{initial } 60° \text{ gloss}} \times 100$$

(*3): The coated plate having a top coating was subjected to accelerated exposure for 4000 hours as in (*2) above, and then immersed for 20 hours in hot water at 40° C. Crosscuts were formed on the coated film reaching the substrate, and tape peeling was conducted. The result was evaluated by   which means that no peeling occurred in the surface of the electrodeposited film, and X which means that such peeling occurred.
(*4): The appearance of the coated film was visually evaluated after the same accelerated exposure as in (*3) on the scale of   : no change; and X: blisters and exfoliation were observed.
(*5): Distinctness of image gloss was measured by a distinctness of image gloss-measuring instrument (JCRI-PGD-166 cd meter sold by Japan Color Research Institute).
(*6): Gloss, color (aesthetic characteristics), fatness, smoothness, etc. were visually evaluated on the following scale.
   : Excellent in all items of evaluation
Δ: general finish as obtained heretofore.
(*7): Visually evaluated.
   : good
Δ: inferior being able to form a cathodically electrodepositable aqueous bath by neutralization with an acid, (B) a nonionic film-forming resin having a surface tension of 25 to 45 dynes/cm, and (C) a blocked polyisocyanate compound as a curing agent, the weight ratio of resin (A) to resin (B) being from 60:40 to 98:2 and the surface tension of resin (A) being at least 5 dynes/cm higher than that of resin (B), and the resin (A) and the resin (B) being incompatible or difficultly compatible with each other, and curing the coated film by heating, (ii) applying a water-base or organic solvent-base colored paint as a first top coat, and (iii) applying as a second top coat a powder paint capable of forming a transparent film.

2. The method of claim 1 wherein the cationic electrodepositable resin (A) is a polyglycidyl ether of a polyphenol having a number average molecular weight of at least 380 and a epoxy equivalent of 190 to 2,000.

3. The method of claim 2 wherein the cationic electrodepositable epoxy resin (A) has a number average molecular weight of 800 to 2,000 and an epoxy equivalent of 400 to 1,000.

4. The method of claim 1 wherein the cationic electrodepositable epoxy resin (A) has a surface tension of 45 to 55 dynes/cm.

5. The method of claim 1 wherein the nonionic film-forming resin (B) is selected from acrylic resins, polyester resins, polyester-modified resins and silicone-modified resins.

6. The method of claim 1 wherein the nonionic film-forming resin (B) has a surface tension of 28 to 40 dynes/cm.

7. The method of claim 1 wherein ratio of the resin (A) to the resin (B) in the multilayer film-forming cationic electrodeposition paint is from 70:30 to 95:5.

8. The method of claim 1 wherein the colored paint is a water-base paint containing a metallic pigment and/or a colored pigment.

9. The method of claim 1 wherein the colored paint is a water-base or organic solvent-base paint containing a dye.

10. The method of claim 1 wherein as the first top coat, a colored pigment containing a metallic paint and/or a colored pigment is first applied and then a paint containing dye is applied.

11. The method of claim 1 wherein as the first top coat, a water-base or organic solvent-base colored paint capable of forming a coated film having an average light transmittance at a wavelength of 400 to 700 nm of not more than 5% at a cured film thickness of 30 microns is applied, and then a titanium dioxide-coated iron oxide pigment-containing paint is applied.

12. The method of claim 11 wherein the titanium dioxide-coated iron oxide pigment-containing paint is a water-base or organic solvent-base paint containing a titanium dioxide coated iron oxide pigment a base resin and a curing agent, said iron oxide pigment being composed of iron oxide particles containing at least 80% by weight of alpha-iron oxide crystals and titanium dioxide coating said iron oxide particles, said titanium oxide-coated iron oxide pigment having a longitudinal size as an average center particle diameter of 5 to 30 microns and a thickness 1/10 to 1/20 of the longitudinal size, the amount of the titanium dioxide-coated iron oxide pigment being 0.1 to 30 parts by weight per 100 parts by weight as solids of the total solids of the base resin and the curing agent.

13. The method of claim 1 wherein the colored paint is a water-base or organic solvent-base paint containing plate-like crystals of phthalocyanine having a long diameter of 5 to 50 microns and a short diameter of 1 to 30 microns and at least one coloring agent selected from colored pigments having a size of not more than 1 micron and mica.

14. The method of claim 1 wherein the colored paint is a water-base or organic solvent-base paint containing scaly graphite particles.

15. The method of claim 1 wherein the powder paint is a powder paint which does not substantially contain a coloring agent and can form a transparent coated film.

16. The method of claim 1 wherein a colored paint capable of forming a coated film having an average visible light transmittance at a wavelength of 400 to 700 nm of not more than 5% at a film thickness of 20 microns is coated as the first top coat on the surface of the electrodeposited film; and then a powder paint containing a coloring agent and being capable of forming a transparent coated film having an average visible light transmittance at a wavelength of 400 to 700 nm of 30 to 90% at a film thickness of 60 microns is then applied as the second top coat.

17. An article coated by the method of claim 1.

18. The method of claim 1 which includes an additional step of air-drying at from room temperature to below 100° C. to remove most or all of the water or organic solvent contained in the applied colored paint film before applying the powder paint.

19. The method of claim 18 which includes an additional step of air-drying at from room temperature to below 100° C. to remove most or all of the water contained in the applied water-base colored paint film before applying the powder paint.

* * * * *